United States Patent
Shin et al.

(10) Patent No.: US 8,295,662 B2
(45) Date of Patent: Oct. 23, 2012

(54) LASER SYSTEM

(75) Inventors: Hyun-Cheul Shin, Suwon-si (KR);
Kyong-Taeg Lee, Suwon-si (KR);
Won-Woong Jung, Suwon-si (KR);
Tae-Wook Kang, Suwon-si (KR)

(73) Assignee: Samsung Mobile Display Co., Ltd.,
Giheung-Gu, Yongin, Gyunggi-Do (KR)

( * ) Notice: Subject to any disclaimer, the term of this patent is extended or adjusted under 35 U.S.C. 154(b) by 230 days.

(21) Appl. No.: 12/635,991

(22) Filed: Dec. 11, 2009

(65) Prior Publication Data

US 2010/0150201 A1    Jun. 17, 2010

(30) Foreign Application Priority Data

Dec. 12, 2008    (KR) .................. 10-2008-0126774

(51) Int. Cl.
*G02B 6/32* (2006.01)

(52) U.S. Cl. .......................................... 385/33; 385/24
(58) Field of Classification Search .................. None
See application file for complete search history.

(56) References Cited

U.S. PATENT DOCUMENTS

| | | | |
|---|---|---|---|
| 5,068,515 A | 11/1991 | Van den Bergh et al. | |
| 5,394,492 A | 2/1995 | Hwang | |
| 6,144,787 A * | 11/2000 | Johnston et al. | 385/31 |
| 7,526,165 B2 * | 4/2009 | Nielsen et al. | 385/125 |
| 2004/0042718 A1 | 3/2004 | Kohns | |
| 2004/0078030 A1 | 4/2004 | Lin | |
| 2007/0100401 A1 | 5/2007 | Lin | |
| 2007/0237453 A1 | 10/2007 | Nielsen et al. | |

FOREIGN PATENT DOCUMENTS

| | | |
|---|---|---|
| CN | 200610113045 | 9/2006 |
| CN | 1916678 A | 2/2007 |
| JP | 2-42407 A | 2/1990 |
| JP | 2-163707 A | 6/1990 |
| JP | 4-70632 U | 6/1992 |
| JP | 4-116802 U | 10/1992 |
| JP | 7-60465 | 3/1995 |
| JP | 11-224966 | 8/1999 |
| JP | 2000-221375 A | 8/2000 |
| JP | 2000-241658 A | 9/2000 |
| JP | 2000307177 | 11/2000 |
| JP | KR 10-2005-0038951 | 4/2005 |
| JP | 2007-125616 A | 5/2007 |
| JP | 2008-124358 A | 5/2008 |
| WO | 03098294 A1 | 11/2003 |

OTHER PUBLICATIONS

EESR dated May 20, 2011 of the corresponding European Patent Application No. 09252777.9.

* cited by examiner

Primary Examiner — Tina Wong
(74) Attorney, Agent, or Firm — Robert E. Bushnell, Esq.

(57) ABSTRACT

A laser system including an optical cable jumper with input and output terminals, and a laser gun, wherein the optical jumper transmits a laser beam from a bundle-type optical cable connected to an input terminal thereof to a single-type optical cable connected to an output terminal thereof. The laser gun is connected to the single-type optical cable at a rear of the optical cable jumper to illuminate the laser beam to a target object.

33 Claims, 4 Drawing Sheets

LASER SYSTEM

CROSS-REFERENCE TO RELATED APPLICATION

This application claims the benefit of Korean Application No. 2008-126774, filed Dec. 12, 2008 in the Korean Intellectual Property Office, the disclosure of which is incorporated herein by reference.

BACKGROUND OF THE INVENTION

1. Field of the Invention

Aspects of the present invention relate to a laser system, and more particularly, to a laser system that makes an energy density of a laser beam uniform when a bundle-type laser beam is converted into a single-type laser beam.

2. Description of the Related Art

A laser makes it possible to focus a high energy beam on to a narrow region, and is widely used in processing a precise pattern for a semiconductor or a display, and sealing thereof. Though the laser beam is relatively small in diffusion while propagating, the energy flow is not uniform over the entire sectional area of the laser beam. That is, the energy flow over a sectional area of the laser beam is focused on the center thereof in accordance with a Gaussian distribution.

An optical cable to transmit a laser beam may be a bundle type or a single type, and the bundle-type optical cable may be connected to the single-type optical cable, depending upon the needs and usages thereof. In particular, a laser beam mixer is used to connect the bundle-type optical cable with the single-type of optical cable to convert a bundle-type laser beam into a single-type laser beam. The laser beam mixer mixes the input laser beam components at a predetermined ratio, and outputs the mixed components.

When the laser beam mixer is newly mounted in the laser system, the laser beam mixer should be aligned according to the beam characteristics of the laser system. For example, with the alignment, the center of the laser beam coincides with the lenses of input and output terminals of the laser beam mixer, and the distance between the input and output terminals is controlled. However, as the laser beam propagates through a three-dimensional space, it is difficult to make the center of the laser beam coincide with the two lenses while controlling the distance between them.

The above information disclosed in this Background section is only for enhancement of understanding of the background of the invention and, therefore, may contain information that does not form the prior art that is already known in this country to a person of ordinary skill in the art.

SUMMARY OF THE INVENTION

Aspects of the present invention provide a laser system having advantages of making an energy density of a laser beam uniform when a bundle-type laser beam is converted into a single-type laser beam, and not requiring distance control between laser beam mixer lenses and an aligning of a center of an input laser beam to the mixer lenses.

According to an aspect of the present invention, there is provided a laser system including: an optical cable jumper including an input terminal and an output terminal to transmit a laser beam from a bundle-type optical cable connected to the input terminal to a single-type optical cable connected to the output terminal; and a laser gun connected to the single-type optical cable to illuminate the laser beam, transmitted from the bundle-type optical cable to the single-type optical cable in the optical cable jumper, to a target object.

The output terminal of the optical cable jumper may have a first numerical aperture (NA), and an output terminal of the laser gun may have a second NA, the first NA may be established to have a value that is a difference between a first diameter of a laser beam profile at the optical cable jumper at a predetermined percentage value region where an energy distribution of the laser beam has a maximum value and a second diameter of the laser beam profile at the optical cable jumper at a focus region of the laser beam divided by a distance between the predetermined percentage value region and the focus region, and the second NA may be established to have a value that is a difference between a third diameter of a laser beam profile at the laser gun at a predetermined percentage value region where an energy distribution of the laser beam has a maximum value and a fourth diameter of the laser beam profile at the laser gun at a focus region of the laser beam divided by a distance between the predetermined percentage value region and the focus region.

The second NA of the laser gun may be greater than 0 and less than 0.25.

The second NA of the laser gun may be greater than or equal to 0.05 and less than 0.25.

The first NA of the output terminal may be greater than or equal to 0.05 and less than or equal to 0.15.

The optical cable jumper may include an optical tube and first and second microlenses.

The optical tube may include a first optical tube forming the output terminal and having a pair of built-in microlenses, and a second optical tube coupled to the first optical tube and forming the input terminal.

The laser system may further include a mode scrambler to mix the laser beam by controlling a curvature radius of the single-type optical cable connected to the optical cable jumper.

The mode scrambler may include: a plate provided to support the single-type optical cable; a pair of clamps mounted at the plate to loosely hold both sides of the single-type optical cable; and a curvature radius controller mounted at the plate to control the curvature radius of the single-type optical cable between the pair of clamps.

The curvature radius controller may include a body fixedly mounted at the plate, and a rod fitted to the body such that the rod is inserted into or drawn out from the body, the rod being connected to the single-type optical cable.

The single-type optical cable may be wound at a side of the mode scrambler to form at least one circle.

The laser system may further include a first bracket to maintain the single-type optical cable in a straight-line state at a side of the laser gun.

The first bracket may include first and second plates combined face-to-face with each other, and the first and the second plates may respectively include first and second grooves facing each other and collectively corresponding to at least a diameter of the single-type optical cable.

The first and second grooves may coincide with a length of the single-type optical cable, and a diameter of a circle constructed by the first and the second grooves may be greater than the diameter of the single-type optical cable.

The laser system may further include: a second bracket to mount the laser gun; a guide to movably mount the second bracket, such that the second bracket is movable along a length direction of the single-type optical cable; and a mover to fixedly mount the guide.

A distance between an end of the first bracket opposite to the laser gun and an end of the single-type optical cable connected to the laser gun may be at least 50 mm.

According to another aspect of the present invention, there is provided a laser system including: an optical cable jumper comprising an input terminal and an output terminal to transmit a laser beam from a bundle-type optical cable connected to the input terminal to a single-type optical cable connected to the output terminal, wherein the optical cable jumper outputs the laser beam with a uniform energy density to be illuminated to a target object without performing a process of aligning a center of the laser beam therein.

According to yet another aspect of the present invention, there is provided an optical cable jumper for a laser system, the optical cable jumper including: an input terminal and an output terminal to transmit a laser beam from a bundle-type optical cable connected to the input terminal to a single-type optical cable connected to the output terminal, wherein the optical cable jumper outputs the laser beam with a uniform energy density to be illuminated to a target object without performing a process of aligning a center of the laser beam therein.

According to still another aspect of the present invention, there is provided a laser system including: an optical cable jumper comprising an input terminal and an output terminal to transmit a laser beam from a bundle-type optical cable connected to the input terminal to a single-type optical cable connected to the output terminal; and a first bracket to maintain the single-type optical cable in a straight-line state at a target object side of the optical cable jumper, such that the optical cable jumper outputs the laser beam with a uniform energy density to be illuminated to the target object without performing a process of aligning a center of the laser beam therein.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
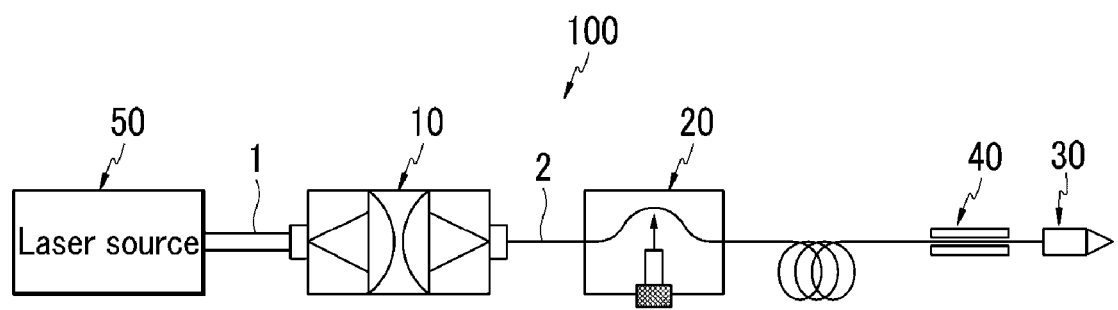
FIG. 1 is a block diagram of a laser system according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a block diagram of a laser system 100 according to an embodiment of the present invention. Referring to FIG. 1, the laser system 100 includes an optical cable jumper 10 to connect a bundle-type optical cable 1 with a single-type optical cable 2, a mode scrambler 20, a laser gun 30, and a first bracket 40.

A laser source 50 includes a plurality of laser diodes (not shown). A power of the laser source 50 is determined by in-parallel combinations of the plurality of laser diodes. The bundle-type optical cable 1 binds optical fibers connected to the laser source 50 (i.e., the laser diodes thereof) into one, to thereby form a bundle. The laser beam at the end of the bundle-type optical cable 1 forms a non-uniform energy density state by way of the intrinsic characteristics of the laser diodes and the optical fibers.

Figure 2:
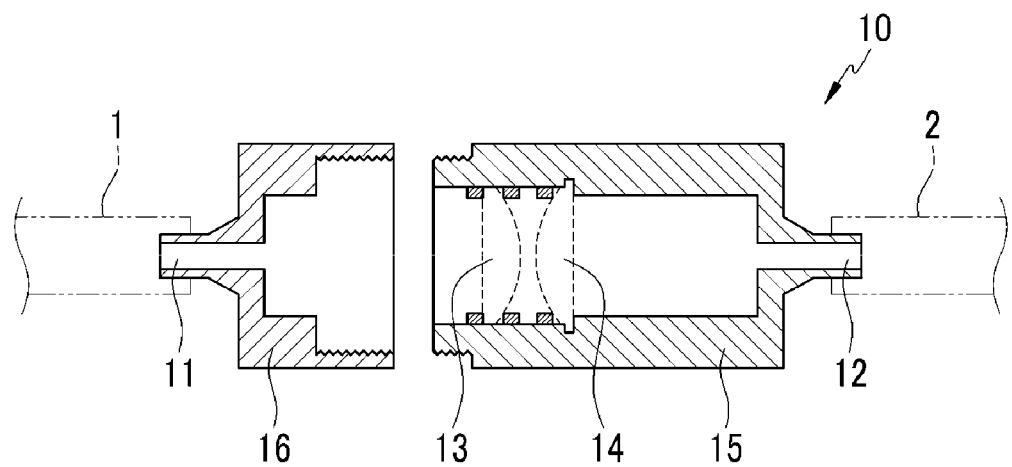
FIG. 2 is an exploded sectional view of an optical cable jumper shown in FIG. 1.

The optical cable jumper 10 has input and output terminals 11 and 12 (see FIG. 2). Specifically, the bundle-type optical cable 1 is connected to the input terminal 11, while the single-type optical cable 2 is connected to the output terminal 12. Accordingly, the optical cable jumper 10 transmits the laser beam from the bundle-type optical cable 1 connected to the input terminal 11 thereof to the single-type optical cable 2 connected to the output terminal 12 thereof.

The optical cable jumper 10 reduces the laser beam input through the input terminal 11 by way of a pair of microlenses 13 and 14 (see FIG. 2), and transmits the laser beam to the output terminal 12. By using the microlenses 13 and 14 to connect the bundle-type optical cable 1 to the single-type optical cable 2, the structure of the laser system 100 is simplified. Furthermore, the optical cable jumper 10 does not require a separate, additional process of aligning the center of laser beam to the pair of microlenses 13 and 14.

FIG. 2 is an exploded sectional view of the optical cable jumper 10 shown in FIG. 1. Referring to FIG. 2, the optical cable jumper 10 includes a first optical tube 15 having the pair of built-in microlenses 13 and 14, and a second optical tube 16 screw-coupled to the first optical tube 15. However, it is understood that aspects of the present invention are not limited to such a screw-coupling, and the first and second optical tubes 15 and 16 may be connected by other methods and/or devices (such as a fasten-grip, an adhesive, or a coupling device). The pair of microlenses 13 and 14 may have a ratio therebetween such that the laser beam is reduced, for example, to have a ratio of 1.28:1.

The first optical tube 15 includes the output terminal 12 that is connected to the single-type optical cable 2. The second optical tube 16 includes the input terminal 11 that is connected to the bundle-type optical cable 1. The laser beam transmitted through the bundle-type optical cable 1 connected to the input terminal 11 is reduced, for example, by the ratio of 1.28:1 by way of the microlenses 13 and 14, and is transmitted to the single-type optical cable 2 connected to the output terminal 12. It is understood that aspects of the present invention are not limited to the reduction ratio of 1.28:1, and the pair of microlenses 13 and 14 may be configured to provide for other reduction ratios according to other aspects.

Figure 3:
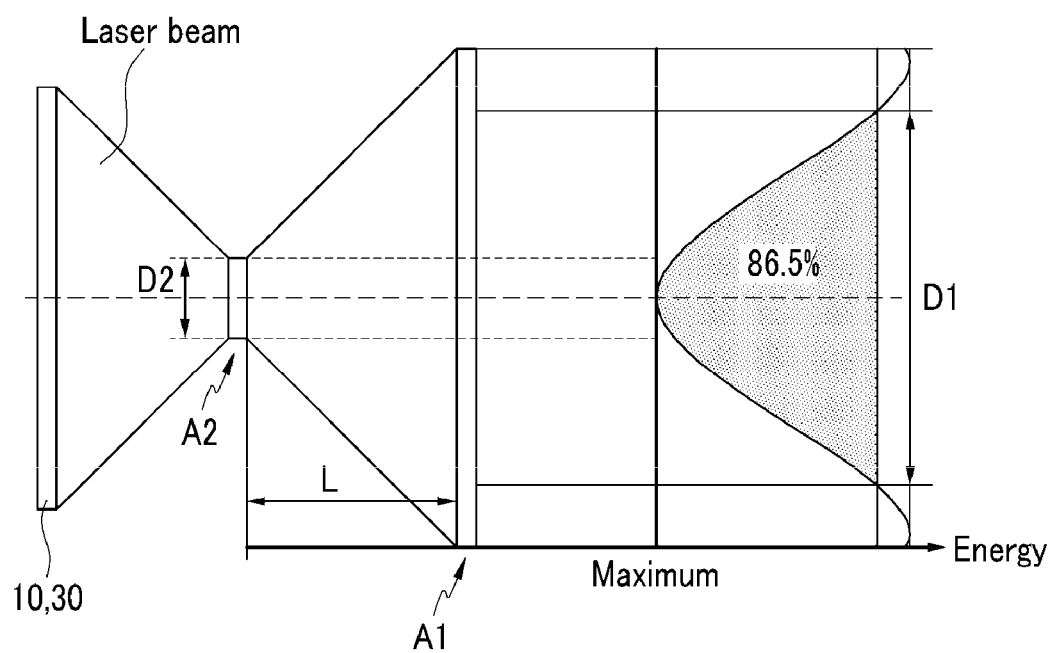
FIG. 3 is a schematic view defining a numerical aperture (NA) applied to the laser system shown in FIG. 1.

FIG. 3 is a schematic view defining a numerical aperture (NA) applied to the laser system 100 shown in FIG. 1. Referring to FIG. 3, the NA is established to have a value (D1−D2)/L, where D1−D2 is a difference between first and second diameters (or third and fourth diameters) D1 and D2 at two predetermined regions pursuant to the energy density distribution of the laser beam, and L is the distance between the two diameters. According to the present embodiment, the NA has a first NA determined at the optical cable jumper 10, and a second NA determined at the laser gun 30.

In detail, the first diameter (or the third diameter) D1 means a diameter of the laser beam which is determined at a predetermined percentage value (for instance, 86.5%) region of the total energy on the profile of the laser beam. The second diameter (or the fourth diameter) D2 mans a diameter of the laser beams which is determined at a region where the laser beam has a minimal size (i.e., at a focus region on the profile of the laser beam). That is, the first NA determined at the output terminal 12 of the optical cable jumper 10 is established to have a value (D1−D2)/L, which is the difference D1−D2 between the first diameter D1 of the laser beam profile formed at the 86.5% region A1 of the total laser beam energy output from the optical cable jumper 10 and the second diameter D2 of the laser beam profile formed at the focus region A2, divided by the distance L between the two regions. For example, the first NA determined at the output terminal 12 of the optical cable jumper 10 may be in the range of 0.05 to 0.15.

If the first NA is less than 0.05, the first and second optical tubes 15 and 16 and the microlenses 13 and 14 have substantially the same diameter so that the diameter difference (D1−D2) is small, and/or the first and second optical tubes 15 and 16 are overly elongated in length (i.e., L is large). By contrast, if the first NA exceeds 0.15, the diameter difference (D1−D2) between the first and second optical tubes 15 and 16 and the microlenses 13 and 14 is relatively large, and/or the first and second tubes 15 and 16 are overly shortened in length (i.e., L is small).

Thus, according to aspects of the present invention, the first NA is limited to a range in which the center alignment of the laser beam between the microlenses 13 and 14 is easily performed, and there is no difficulty in dimension and production. Moreover, the first NA may be controlled to be in the range of 0.05 to 0.15 so that the second NA is in a range of greater than 0 to less than 0.25 (for example, from 0.05 to less than 0.25).

The mode scrambler 20 is disposed at the rear of the optical cable jumper 10 to control the curvature of the single-type optical cable 2 (i.e., the first curvature radius R1). That is, if the center of the laser beam is not correctly aligned at the output terminal 12 of the optical cable jumper 10, the mode scrambler 20 curves the single-type optical cable 12 with the first curvature radius R1 so that the center of the laser beam can be directed to the center of the single core.

Figure 4:
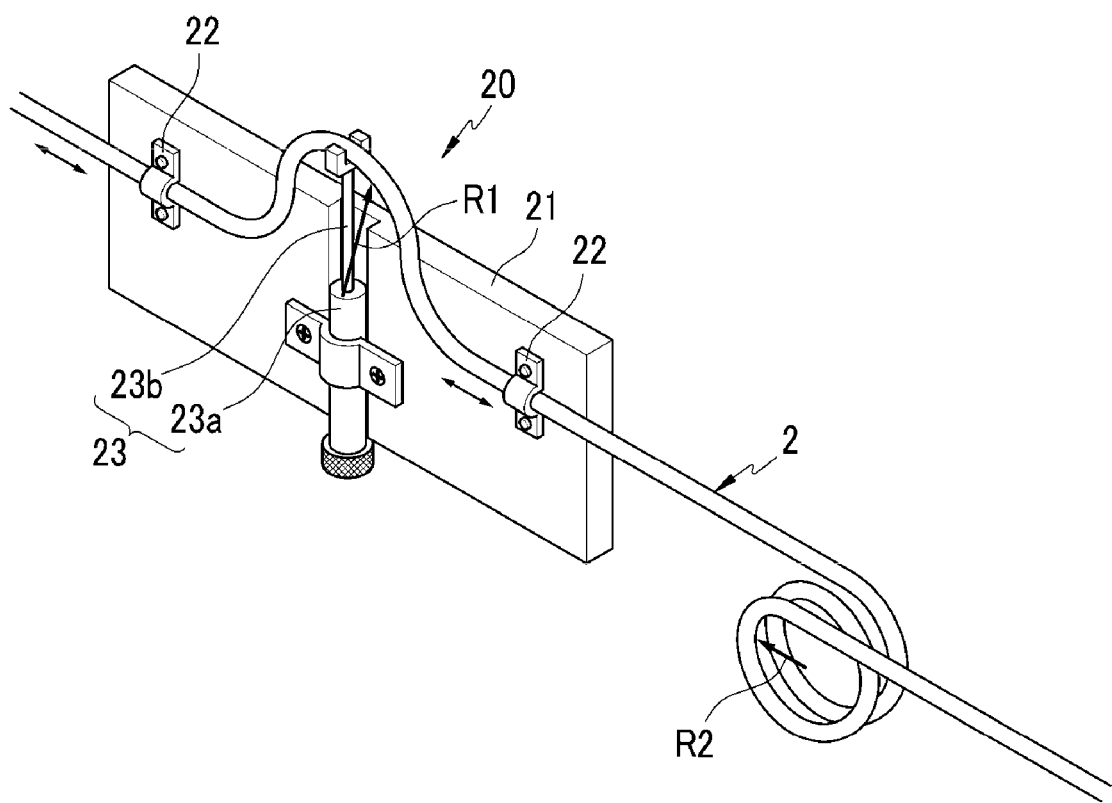
FIG. 4 is a perspective view of a mode scrambler shown in FIG. 1.

FIG. 4 is a perspective view of the mode scrambler 20 shown in FIG. 1. Referring to FIG. 4, the mode scrambler 20 includes a plate 21, a pair of clamps 22, and a curvature radius controller 23. The plate 21 is provided to partially correspond to the single-type optical cable 2.

The pair of clamps 22 hold both sides of the single-type optical cable 2 on the plate 21. With this holding structure, when the first curvature radius R1 of the single-type optical cable 2 is controlled on the plate 21, the single-type optical cable 2 can move in the longitudinal direction.

The curvature radius controller 23 is mounted at the plate 21 between the pair of clamps 22 such that the curvature radius controller 23 controls the first curvature radius R1 of the single-type optical cable 2. For example, the curvature radius controller 23 includes a body 23a fixedly mounted at the plate 21, and a rod 23b fitted to the body 23a such that the rod 23b can be inserted into or drawn out from the body 23a. That is, the curvature radius controller 23 may be formed as a micrometer thimble and sleeve, though aspects of the present invention are not limited thereto. Accordingly, the curvature radius controller 23 may control the first curvature radius R1 of the single-type optical cable 2 connected to the rod 23b as the rod 23b is inserted into or drawn out from the body 23a.

Furthermore, according to aspects of the present invention, the single-type optical cable 2 may be wound at the rear of the curvature radius controller 23 so as to form at least one circle.

The circular-wound single-type optical cable 2 forms a second curvature radius R2. The second curvature radius R2 further scatters the laser beam transmitted through the single-type optical cable 2 within the single core so as to increase the uniformity of the energy density. If the first curvature radius R1 is greater than the second curvature radius R2, the NA is further enhanced, and the energy density at the beam profile is made more uniform.

Referring back to FIG. 1, the laser gun 30 is connected to the single-type optical cable 2 at the rear of the mode scrambler 20 to illuminate the laser beam transmitted through the single-type cable 2 onto the target. For this purpose, the laser gun 30 may have a 1:1 ratio optical system (not shown) to illuminate the transmitted laser beam onto the target.

The first bracket 40 maintains the single-type optical cable 2 in a straight line state at the end of the laser gun 30. That is, the first bracket 40 prevents the single-type optical cable 2 transmitting the laser beam that is mixed in the mode scrambler 20 and correctly aligned in the center from being shaken before entering the laser gun 30. Accordingly, the first bracket 40 prevents the center of the laser beam that is transmitted through the single-type optical cable 2 from misaligning with regard to the center of the optical system (not shown) of the laser gun 30.

Figure 5:
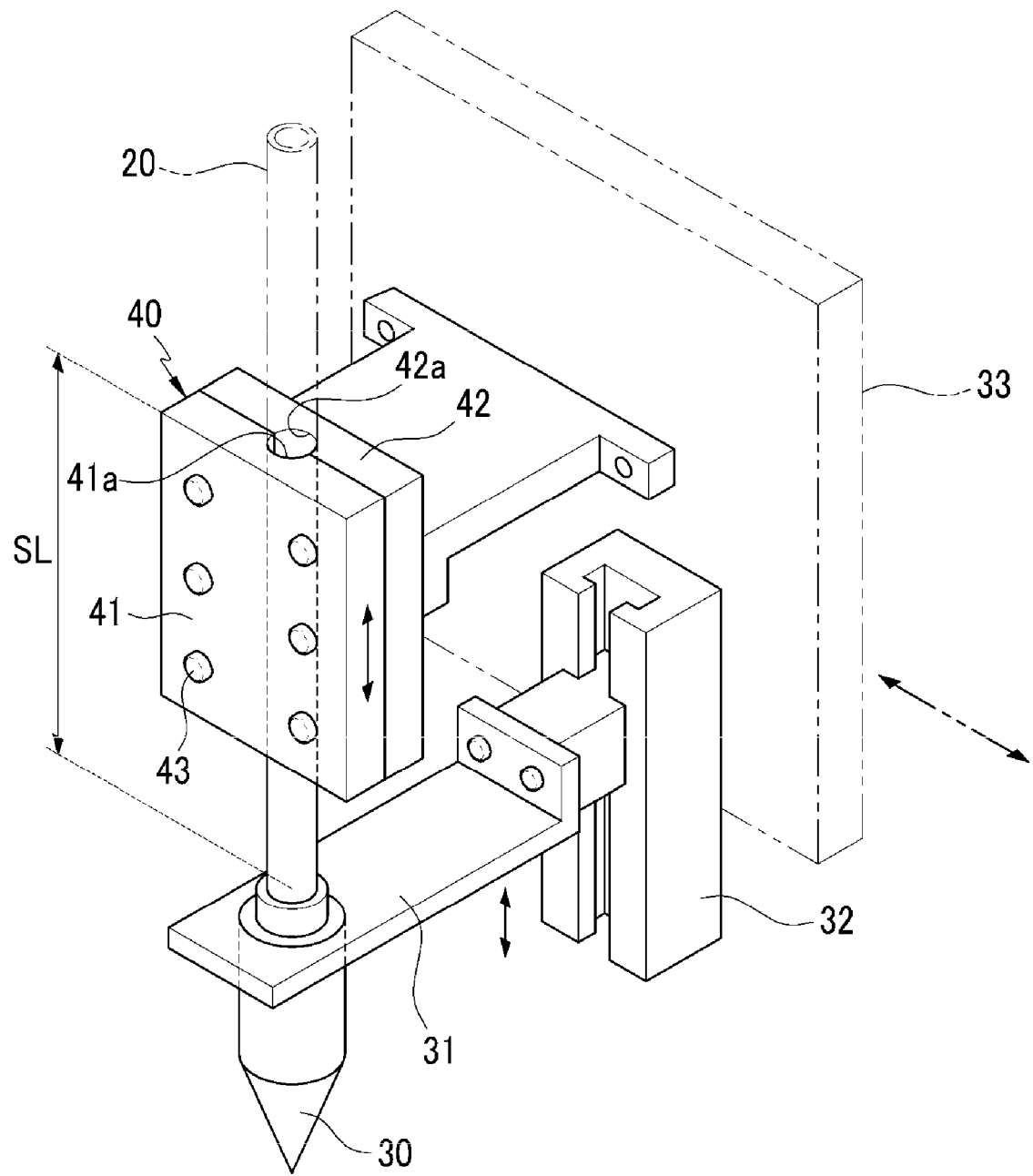
FIG. 5 is a perspective view of first and second brackets according to an embodiment of the present invention.

FIG. 5 is a perspective view of the first bracket 40 and a second bracket 31. Referring to FIG. 5, the first bracket 40 has first and second plates 41 and 42 combined face-to-face with each other. The first and second bracket plates 41 and 42 shown in FIG. 5 are coupled to each other by way of one or more screws 43, though aspects of the present invention are not limited thereto and other coupling methods or devices may be used in other aspects.

First and second grooves 41a and 42a are respectively formed on the surfaces of the first and second bracket plates 41 and 42 facing each other. The first and second grooves 41a and 42a may be semi-circular, or other shapes according to other aspects. The first and second grooves 41a and 42a may collectively correspond to the diameter of the single-type optical cable 2. Furthermore, the first and second grooves 41a and 42a are formed to progress along a longitudinal direction of the single-type optical cable 2.

The diameter formed by the semicircles of the first and second grooves 41a and 42a is larger than the diameter of the single-type optical cable 2 such that the first and second grooves 41 and 42a restrict a diameter-directed movement (i.e., latitudinal movement) of the single-type optical cable 2 while enabling a longitudinal movement thereof. That is, the single-type optical cable 2 can move up and down within the first and second bracket plates 41 and 42 as the laser gun 30 moves up and down.

The laser gun 30 is mounted at the second bracket 31. The second bracket 31 is, in turn, mounted to a guide 32 such that the second bracket can move in the vertical direction. The guide 32 is fixedly mounted at a mover 33 of the laser system 100. Furthermore, the first bracket 40 is fixedly mounted at the mover 33.

As shown in FIG. 5, when the mover 33 moves left and right and up and down, the first bracket 40 and the guide 32 collectively move left and right and up and down, respectively. Furthermore, the second bracket 31 mounting the laser gun 30 thereat moves up and down along the guide 32 independently of the left and right movement of the mover 33. It is understood that the left, right, up, and down directions are provided in relation to the structure illustrated in FIG. 5, and are therefore understood as relative directions to the structure of FIG. 5 that can vary according to other structures of other embodiments.

When the second bracket 31 and the laser gun 30 mounted at the second bracket 31 move up and down, the single-type optical cable 2 connected to the laser gun 30 moves up and down together with the laser gun 30. However, the first bracket 40 is in a fixed state such that the single-type optical cable 2 can move relative thereto.

The distance SL between the end of the first bracket 40 opposite to the laser gun 30 and the end of the single-type optical cable 2 may be at least 50 mm. The bracket-cable distance SL is a distance to make the center of the laser beam transmitted from the single-type optical cable 2 coincide with the center of the optical system of the laser gun 30. Accordingly, if the distance SL is less than 50 mm in the present embodiment, center-to-center misalignment may occur. If the bracket-cable distance SL is overly great, interference thereof with other structural components of the laser system 100 may occur. If there is no problem of interference with other structural components, the bracket-cable distance SL may be further elongated within the length range of the single-type optical cable 2.

Referring back to FIG. 3, the first NA determined at the output terminal 12 of the optical cable jumper 10 is established to have a value (D1−D2)/L. Specifically, (D1−D2)/L is the difference D1−D2 between a first diameter D1 of the laser beam profile formed at, for example, the 86.5% region A1 of the total laser beam energy output from the output terminal 12 and the second diameter D2 of the laser beam profile formed at a focus region A2, divided by the distance L between the two regions.

As an example, the second NA determined at the output terminal of the laser gun 30 is in a range of more than 0 to less than 0.25 (specifically, from 0.05 to less than 0.25). In particular, the first NA may be controlled to be limited to the range of 0.05 to 0.15 and the second NA may be controlled to be limited to the range of more than 0 to less than 0.25 or to the range of 0.05 to less than 0.25 in order to make the first NA relatively small at the early progression of the laser beam so that the second NA can be easily controlled at the later progression of the laser beam. That is, the second NA may be first determined such that the first NA is established to be less than the second NA.

With the laser system 100 according to the present embodiment, the second NA is defined by (D1−D2)/L. Accordingly, as the second NA approximates 0.05 or 0, the distance L is enlarged enormously, and/or the first and second diameters D1 and D2 are substantially identical to each other. When the first and second diameters D1 and D2 are substantially identical to each other, the laser beam is roughly in a straight-line state.

In view of device design, if the distance L is not enlarged too much, the first and second diameters D1 and D2 may be substantially identical to each other. When the first and second diameters D1 and D2 are substantially identical to each other, the second NA may approximate 0. However, in this case, even though the distance L is controlled, it is not possible to control the first diameter D1 of the laser beam. Hence, a separate optical system is further used to control the first diameter D1 of the laser beam. Accordingly, only when the second NA is at a suitable degree can the first diameter D1 of the laser beam to be formed on the target be controlled.

A case where the second NA is in a range of more than 0 to less than 0.05 will now be illustrated. Specifically, for a case in which the second diameter D2 is 1.2 mm, the distance L is 5 mm, 10 mm, and 20 mm, respectively, the second NA is 0.04, and the second NA=(D1−D2)/L, the first diameter D1 is calculated according to:

$$(D1-1.2)/5=0.04 \rightarrow D1=1.4 \quad (1)$$

$$(D1-1.2)/10=0.04 \rightarrow D1=1.6 \quad (2)$$

$$(D1-1.2)/20=0.04 \rightarrow D1=2.0. \quad (3)$$

Referring to Equation 1 to Equation 3, even if the distance L increases by 15 mm (from 5 mm to 20 mm), the first diameter D1 of the laser beam formed at the target increases by only 0.6 mm (from 1.4 mm to 2.0 mm). Accordingly, the distance L is controlled to be very great, or an additional optical system is used in order to make the first diameter D1 large.

By contrast, the case where the second NA is 0.05 or more will now be illustrated. Specifically, for a case in which the second diameter D2 is 1.2 mm, the distance L is 3 mm, 5 mm, 8 mm, and 11 mm, respectively, the second NA is 0.12, and the second NA=(D1−D2)/L, the first diameter D1 is calculated according to:

$$(D1-1.2)/3=0.12 \rightarrow D1=1.56 \quad (4)$$

$$(D1-1.2)/5=0.12 \rightarrow D1=1.80 \quad (5)$$

$$(D1-1.2)/8=0.12 \rightarrow D1=2.16 \quad (6)$$

$$(D1-1.2)/11=0.12 \rightarrow D1=2.52. \quad (7)$$

Referring to Equation 4 to Equation 7, even if the distance L narrowly increases by 8 mm (from 3 mm to 11 mm), the first diameter D1 formed at the target increases by 0.96 mm, (from 1.56 mm to 2.52 mm). Accordingly, the distance L is not required to be very great in order to make the first diameter D1 large.

Furthermore, with the system according to the present embodiment, the second NA is defined by (D1−D2)/L. If the second NA is large, the first diameter D1 is significantly larger than the second diameter D2 and/or the distance L is relatively small.

If the first diameter D1 is very large, as the total energy is maintained to be constant, a large circle is formed at the 86.5% region, and the energy density corresponding to the large circle becomes very low. Accordingly, the maximum energy value at the Gaussian curve becomes very low.

By contrast, the distance between the focus region for forming the second diameter D2 and the target should be short in order to make the distance L small. However, such a configuration forms a mechanically unstable system.

Furthermore, as the second NA is enlarged, the diffusion angle of the laser beam becomes significantly increased. In this case, the energy density of the laser beam and the first diameter D1 relate with respect to the distance L very well. Accordingly, the upper limit value of the second NA may be restricted in order to maintain the Gaussian curve with the maximum energy value of a predetermined value or more within the predetermined total energy.

The case where the second NA is 0.25 or more will now be illustrated. Specifically, for a case in which the second diameter D2 is 1.2 mm, the distance L is 3 mm, 5 mm, 8 mm, and 11 mm, respectively, the second NA is 0.25, and the second NA=(D1−D2)/L, the first diameter D1 is calculated according to:

$$(D1-1.2)/3=0.25 \rightarrow D1=1.95 \quad (8)$$

$$(D1-1.2)/5=0.25 \rightarrow D1=2.45 \quad (9)$$

$$(D1-1.2)/8=0.25 \rightarrow > D1=3.20 \quad (10)$$

$$(D1-1.2)/11=0.25 \rightarrow > D1=3.95 \quad (11)$$

Referring to Equation 8 to Equation 11, if the distance L narrowly increases by 8 mm (from 3 mm to 11 mm), the first diameter D1 increases by 2.0 mm (from 1.95 mm to 3.95 mm). Accordingly, even if the distance L is altered very slightly, the first diameter D1 formed at the target is altered enormously, and it becomes difficult to control the first diameter D1. As a result, the second NA at the output terminal of the laser gun 30 is limited to the range of more than 0 to less than 0.25. In this case, an additional optical system can be used within the range of more than 0 to less than 0.05.

Furthermore, if the second NA at the output terminal of the laser gun 30 is limited to the range of 0.05 to less than 0.25, no additional optical systems are used. In this case, even if the distance L is not largely controlled, it is relatively easy to control the first diameter D1 of the laser beam formed at the target, and the energy density.

Although a few embodiments of the present invention have been shown and described, it would be appreciated by those skilled in the art that changes may be made in this embodiment, without departing from the principles and spirit of the invention, the scope of which is defined in the claims and their equivalents.

What is claimed is:

1. A laser system, comprising:
    an optical cable jumper comprising an input terminal and an output terminal to transmit a laser beam from a bundle-type optical cable connected to the input terminal to a single-type optical cable connected to the output terminal; and
    a laser gun connected to the single-type optical cable to illuminate the laser beam, transmitted from the bundle-type optical cable to the single-type optical cable in the optical cable jumper, to a target object,
    the output terminal of the optical cable jumper has a first numerical aperture (NM, and an output terminal of the laser gun has a second NA;
    the first NA is equal to a difference between a first diameter of a laser beam profile at the optical cable jumper at a predetermined percentage value region where an energy distribution of the laser beam has a maximum value and a second diameter of the laser beam profile at the optical cable jumper at a focus region of the laser beam divided by a distance between the predetermined percentage value region and the focus region; and
    the second NA is equal to a difference between a third diameter of a laser beam profile at the laser gun at a predetermined percentage value region where an energy distribution of the laser beam has a maximum value and a fourth diameter of the laser beam profile at the laser gun at a focus region of the laser beam divided by a distance between the predetermined percentage value region and the focus region.

2. The laser system as claimed in claim 1, wherein the second NA is greater than 0 and less than 0.25.

3. The laser system as claimed in claim 2, wherein the second NA is less than 0.05 and the third diameter is controlled by an optical system, different from the laser system.

4. The laser system as claimed in claim 2, wherein the second NA is greater than or equal to 0.05 and less than 0.25.

5. The laser system as claimed in claim 4, wherein the first NA is greater than or equal to 0.05 and less than or equal to 0.15.

6. The laser system as claimed in claim 1, wherein the optical cable jumper comprises an optical tube, a first microlens, and a second microlens.

7. The laser system as claimed in claim 6, wherein the optical tube comprises a first optical tube forming the output terminal and having a pair of built-in microlenses, and a second optical tube coupled to the first optical tube and forming the input terminal.

8. The laser system as claimed in claim 7, wherein the first optical tube comprises the first and the second microlenses.

9. The laser system as claimed in claim 7, wherein the predetermined percentage value region is at the first microlens, and the focus region is at the second microlens.

10. The laser system as claimed in claim 7, wherein the second optical tube is screw-coupled to the first optical tube.

11. The laser system as claimed in claim 1, further comprising a mode scrambler to mix the laser beam by controlling a curvature radius of the single-type optical cable connected to the optical cable jumper.

12. The laser system as claimed in claim 11, wherein the mode scrambler comprises:
    a plate provided to support the single-type optical cable;
    a pair of clamps mounted at the plate to loosely hold both sides of the single-type optical cable; and
    a curvature radius controller mounted at the plate to control the curvature radius of the single-type optical cable between the pair of clamps.

13. The laser system as claimed in claim 12, wherein the curvature radius controller comprises a body fixedly mounted at the plate, and a rod fitted to the body such that the rod is inserted into or drawn out from the body, the rod connected to the single-type optical cable.

14. The laser system as claimed in claim 12, wherein the single-type optical cable is wound at a side of the mode scrambler to form at least one circle.

15. The laser system as claimed in claim 1, further comprising a first bracket to maintain the single-type optical cable in a straight-line state at a side of the laser gun.

16. The laser system as claimed in claim 15, wherein the first bracket comprises first and second plates combined face-to-face with each other, and the first and the second plates respectively include first and second grooves facing each other and collectively corresponding to at least a diameter of the single-type optical cable.

17. The laser system as claimed in claim 16, wherein the first and second grooves coincide with a length of the single-type optical cable, and a diameter of a circle constructed by the first and the second grooves is greater than the diameter of the single-type optical cable.

18. The laser system as claimed in claim 17, further comprising:
    a second bracket to mount the laser gun thereat;
    a guide to movably mount the second bracket, such that the second bracket is movable along a length direction of the single-type optical cable; and
    a mover to fixedly mount the guide.

19. The laser system as claimed in claim 15, wherein a distance between an end of the first bracket opposite to the laser gun and an end of the single-type optical cable connected to the laser gun is at least 50 mm.

20. The laser system as claimed in claim 1, wherein the predetermined percent value is 86.5% of a total energy of the laser beam profile at the optical cable jumper and the laser gun.

21. A laser system, comprising:
    an optical cable jumper comprising an input terminal and an output terminal to transmit a laser beam from a bundle-type optical cable connected to the input terminal to a single-type optical cable connected to the output terminal,
    wherein the optical cable juniper outputs the laser beam with a uniform energy density to be illuminated to a target object without performing a process of aligning a center of the laser beam therein, the output terminal of the optical cable jumper has a numerical aperture (NA) equal to a difference between a first diameter of a laser beam profile at the optical cable jumper at a predetermined percentage value region where an energy distribution of the laser beam has a maximum value and a second diameter of the laser beam profile at the optical cable jumper at a focus region of the laser beam divided by a distance between the predetermined percentage value region and the focus region.

22. The laser system as claimed in claim 21, wherein the first NA is greater than or equal to 0.05 and less than or equal to 0.15.

23. The laser system as claimed in claim 21, wherein the optical cable jumper comprises an optical tube, a first microlens, and a second microlens.

24. The laser system as claimed in claim 23, wherein the optical tube comprises a first optical tube forming the output terminal and having a pair of built-in microlenses, and a second optical tube coupled to the first optical tube and forming the input terminal.

25. The laser system as claimed in claim 24, wherein the first optical tube comprises the first and the second microlenses.

26. The laser system as claimed in claim 24, wherein the predetermined percentage value region is at the first microlens, and the focus region is at the second microlens.

27. An optical cable jumper for a laser system, the optical cable jumper comprising:
    an input terminal and an output terminal to transmit a laser beam from a bundle-type optical cable connected to the input terminal to a single-type optical cable connected to the output terminal,
    wherein the optical cable jumper outputs the laser beam with a uniform energy density to be illuminated to a target object without performing a process of aligning a center of the laser beam therein,
    the output terminal of the optical cable jumper has a numerical aperture (NA) equal to a difference between a first diameter of a laser beam profile at the optical cable jumper at a predetermined percentage value region where an energy distribution of the laser beam has a maximum value and a second diameter of the laser beam profile at the optical cable jumper at a focus region of the laser beam divided by a distance between the predetermined percentage value region and the focus region.

28. The optical cable jumper as claimed in claim 27, further comprising an optical tube, a first microlens, and a second microlens.

29. The optical cable jumper as claimed in claim 28, wherein the optical tube comprises a first optical tube forming the output terminal and having the first and the second microlenses, and a second optical tube coupled to the first optical tube and forming the input terminal.

30. The optical cable jumper as claimed in claim 29, wherein the predetermined percentage value region is at the first microlens, and the focus region is at the second microlens.

31. A laser system, comprising:
    an optical cable jumper comprising an input terminal and an output terminal to transmit a laser beam from a bundle-type optical cable connected to the input terminal to a single-type optical cable connected to the output terminal; and
    a first bracket to maintain the single-type optical cable in a straight-line state at a target object side of the optical cable jumper, such that the optical cable jumper outputs the laser beam with a uniform energy density to be illuminated to the target object without performing a process of aligning a center of the laser beam therein,
    the output terminal of the optical cable jumper has a numerical aperture (NA) equal to a difference between a first diameter of a laser beam profile at the optical cable jumper at a predetermined percentage value region where an energy distribution of the laser beam has a maximum value and a second diameter of the laser beam profile at the optical cable jumper at a focus region of the laser beam divided by a distance between the predetermined percentage value region and the focus region.

32. The laser system as claimed in claim 31, wherein the optical cable jumper comprises a first optical tube forming the output terminal and having first and second microlenses, and a second optical tube coupled to the first optical tube and forming the input terminal.

33. The laser system as claimed in claim 32, wherein the predetermined percentage value region is at the first microlens, and the focus region is at the second microlens.

* * * * *